Patented May 10, 1949

2,469,697

UNITED STATES PATENT OFFICE 2,469,697

PREPARATION OF 2-CHLOROBENZOTHIAZOLE

Neil S. Moon, Rochester, N. Y., assignor to Eastman Kodak Company, Rochester N. Y., a corporation of New Jersey No Drawing. Application December 5, 1946, Serial No. 714,145

5 Claims. (Cl. 260—304)

This invention relates to a process for preparing 2-chlorobenzothiazoles.

2-chlorobenzothiazole has been prepared in low yields by the action of phosphorus pentachloride on phenylisothiocyanate in a sealed tube or in an open flask (Hofmann, Ber., 12, 1126 (1879); 13, 8 (1880); Hunter, J. Chem. Soc., 127, 1488 (1925)); in better yields by the action of phosphorus pentachloride on 2-mercapto benzothiazole, in the presence of phosphorus thiochloride or other solvents at 100° C. (United States Patent 1,878,699, dated September 20, 1932); in still better yields by the action of sulfur chloride or sulfur dichloride on 2-mercaptobenzothiazole (United States Patent 2,043,948, dated June 9, 1936); and in low yields from 2-aminobenzothiazole by a Sandmeyer reaction (Farooq and Hunter, J. Indian Chem. Soc., 10, 563 (1933) and Drozdov and Stavrovskaya, J. Gen. Chem. (U. S. S. R.), 7, 2813 (1937)).

I have now found that 2-chlorobenzothiazole can be prepared in very high yields and in a highly pure form by the action of sulfuryl chloride ($SO_2Cl_2$) on 2-mercaptobenzothiazole. Moreover, other 2-chlorobenzothiazoles can be similarly prepared. Thionyl chloride ($SOCl_2$), on the other hand, does not act upon 2-mercaptobenzothiazole to give 2-chlorobenzothiazole, but rather gives dibenzothiazolyl disulfide instead.

It is, accordingly, an object of my invention to provide an improved method for preparing 2-chlorobenzothiazoles. Other objects will become apparent hereinafter.

In accordance with my invention, I react a 2-mercaptobenzothiazole with sulfuryl chloride ($SO_2Cl_2$). The 2-mercaptobenzothiazole and the sulfuryl chloride react without the application of heat, at temperatures of from about 10° to about 30° C., for example. Advantageously at least about 6 molecular proportions of sulfuryl chloride for each molecular proportion of 2-mercaptobenzothiazole are employed. Still greater excesses of sulfuryl chloride can be employed if desired, e. g. 10 molecular proportions of sulfuryl chloride for each molecular proportion of 2-mercaptobenzothiazole. The reaction mixture can be warmed (e. g. to 50° C.) to drive off the hydrogen chloride and sulfur dioxide formed during the reaction, if desired, but heating is not necessary. The heat of reaction raises the temperature to 35 or 40° C.

After adding the sulfuryl chloride to the 2-mercaptobenzothiazole, the excess sulfuryl chloride is advantageously decomposed by adding ice and water to the reaction mixture. The water layer can then be separated and the oily layer of the 2-chlorobenzothiazole washed several times (e. g. 2 to 4) with water to remove hydrogen chloride and sulfur dioxide. Instead of separating the oily layer and aqueous layer immediately, the acid can be neutralized by treating the aqueous mixture with an alkali, e. g. aqueous sodium hydroxide or aqueous sodium carbonate, or with sodium bicarbonate. Other alkali metal hydroxides, carbonates or bicarbonates can be used.

Especially if the aqueous mixture is neutralized in the manner set forth above, the 2-chlorobenzothiazole is advantageously obtained from the neutralized mixture by steam distillation. The steam distilled product or the product obtained by washing with water as set forth above can then be distilled under reduced pressure.

In addition to 2-chlorobenzothiazole, 2-chloro-5-ethoxybenzothiazole, 2-chloro-5-methoxybenzothiazole, 2-chloro-5-phenylbenzothiazole, 2-chloro-4-nitrobenzothiazole, 2-chloro-5-nitrobenzothiazole, 2-chloro-5-methylbenzothiazole, etc. can be prepared by my new process.

The following example will serve to illustrate further the manner of practicing my new process.

*Example.—2-chlorobenzothiazole*

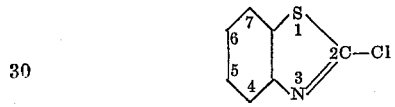

500 g. (3.7 mol.) of sulfuryl chloride ($SO_2Cl_2$) were added to 100 g. (0.6 mol.) of 2-mercaptobenzothiazole, over a period of 5 minutes, at about 25° C., with stirring. The mixture was then allowed to stand for about one hour. To the reaction mixture was then added ice and water to decompose the excess sulfuryl chloride. The oily layer was then separated and washed three times with an equal volume of water. The resulting washed oily layer was then distilled under reduced pressure and 92 g. of 2-chlorobenzothiazole, boiling at 132 to 134° C. at 21 mm. of Hg pressure, was obtained as a colorless liquid. The 2-chlorobenzothiazole melted at 20 to 21.5° C.

In a similar manner, 2-chloro-5-ethoxybenzothiazole can be prepared using a quantity of 5-ethoxy-2-mercaptobenzothiazole molecularly equivalent to the 2-mercaptobenzothiazole; 2-chloro-5-methoxybenzothiazole can be prepared using a quantity of 5-methoxy-2-mercaptobenzothiazole molecularly equivalent to the 2-mercaptobenzothiazole; 2-chloro-5-phenylbenzothiazole can be prepared using a quantity of 2-mercapto-5-phenylbenzothiazole molecularly equivalent to the 2-mercaptobenzothiazole; 2-chloro-4-nitrobenzothiazole can be prepared using an amount of 2-mercapto-4-nitrobenzothiazole molecularly equivalent to the 2-mercaptobenzothiazole, 2-chloro-5-nitrobenzothiazole can be prepared using an amount of 2-mercapto-5-nitrobenzothiazole molecularly equivalent to the 2-mercaptobenzothiazole, etc.

In carrying out my new process, the sulfuryl chloride can be added to the 2-mercaptobenzothiazole or the 2-mercaptobenzothiazole can be added to the sulfuryl chloride.

The process can also be carried out in an inert solvent, e. g. benzene.

What I claim as my invention and desire to be secured by Letters Patent of the United States is:

1. A process for preparing a 2-chlorobenzothiazole comprising reacting, at a temperature of not more than 50° C., one molecular proportion of a 2-mercaptobenzothiazole with at least 6 molecular proportions of sulfuryl chloride ($SO_2Cl_2$).

2. A process for preparing a 2-chlorobenzothiazole comprising reacting, at a temperature of not more than 50° C., a 2-mercaptobenzothiazole with sulfuryl chloride ($SO_2Cl_2$).

3. A process for preparing 2-chlorobenzothiazole comprising reacting, at a temperature of not more than 50° C., 2-mercaptobenzothiazole with sulfuryl chloride ($SO_2Cl_2$).

4. A process for preparing 2-chlorobenzothiazole comprising reacting, at a temperature of not more than 50° C., one molecular proportion of 2-mercaptobenzothiazole with at least six molecular proportions of sulfuryl chloride ($SO_2Cl_2$).

5. A process for preparing 2-chlorobenzothiazole comprising reacting, at a temperature of not more than 50° C., one molecular proportion of 2-mercaptobenzothiazole with at least six molecular proportions of sulfuryl chloride ($SO_2Cl_2$), and treating the resulting reaction mixture with water.

NEIL S. MOON.

REFERENCES CITED

The following references are of record in the file of this patent:

Chemical Abstract, vol. 4, page 1023 citing Journal Chemical Society (London) 95, pp. 1910–1918.